United States Patent
Becker et al.

(10) Patent No.: US 10,329,387 B2
(45) Date of Patent: Jun. 25, 2019

(54) PROCESS FOR MAKING AN AMINOSILOXANE POLYMER NANOEMULSION

(71) Applicant: Wacker Chemie AG, Munich (DE)

(72) Inventors: Richard Becker, Ann Arbor, MI (US); Harry William Broening, Milford, OH (US); Kristi Lynn Fliter, Harrison, OH (US); Markus Merget, Mehring (DE); Stefanie Schuster, Burghausen (DE); Ernst Selbertinger, Burghausen (DE); Mark Robert Sivik, Mason, OH (US); Nicholas David Vetter, Cleves, OH (US); Patrick Brian Whiting, Cincinnati, OH (US); Franz Wimmer, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 114 days.

(21) Appl. No.: 15/500,282

(22) PCT Filed: Jul. 24, 2015

(86) PCT No.: PCT/EP2015/067055
§ 371 (c)(1),
(2) Date: Jan. 30, 2017

(87) PCT Pub. No.: WO2016/016142
PCT Pub. Date: Feb. 4, 2016

(65) Prior Publication Data
US 2017/0218136 A1  Aug. 3, 2017

(30) Foreign Application Priority Data

Jul. 28, 2014 (EP) .................................. 14178766

(51) Int. Cl.
| | | |
|---|---|---|
| *C08J 3/07* | (2006.01) | |
| *C08L 83/04* | (2006.01) | |
| *C08J 3/03* | (2006.01) | |
| *C08L 83/08* | (2006.01) | |

(52) U.S. Cl.
CPC . *C08J 3/07* (2013.01); *C08J 3/03* (2013.01); *C08L 83/04* (2013.01); *C08L 83/08* (2013.01); *C08J 2383/08* (2013.01); *C08J 2483/04* (2013.01); *C08L 2201/52* (2013.01); *C08L 2205/02* (2013.01)

(58) Field of Classification Search
CPC ..... C08J 3/07; C08J 3/03; C08L 83/08; C08L 83/04
See application file for complete search history.

(56) References Cited

U.S. PATENT DOCUMENTS

| | | | | |
|---|---|---|---|---|
| 6,180,117 | B1* | 1/2001 | Berthiaume | A61K 8/068 424/401 |
| 8,637,442 | B2* | 1/2014 | Wang | C09D 183/08 510/119 |
| 8,735,508 | B2* | 5/2014 | Merget | C08G 77/26 525/477 |
| 2006/0041026 | A1* | 2/2006 | Mahr | C04B 41/009 516/55 |
| 2009/0226381 | A1 | 9/2009 | Maillefer et al. | |
| 2010/0304120 | A1 | 12/2010 | Tokudome et al. | |

FOREIGN PATENT DOCUMENTS

| | | |
|---|---|---|
| EP | 1356800 A2 | 10/2003 |
| EP | 1378552 A1 | 1/2004 |
| EP | 1090295 B1 | 6/2010 |
| GB | 2289686 A | 11/1995 |
| JP | 2013543543 A | 12/2013 |
| WO | 2004091559 A2 | 10/2004 |
| WO | 2006097227 A2 | 9/2006 |
| WO | 2012040130 A1 | 3/2012 |

OTHER PUBLICATIONS

Co-pending U.S. Appl. No. 15/500,256, filed Jan. 30, 2017, 100 pages.

* cited by examiner

*Primary Examiner* — Peter D. Mulcahy
(74) *Attorney, Agent, or Firm* — Brooks Kushman P.C.

(57) ABSTRACT

Nanoemulsions are prepared by:
a) solubilizing a silicone resin in an organic solvent system to yield a silicone resin solution concentration of about 80% or less, wherein the organic solvent system comprises a single solvent selected from the group consisting of monoalcohols, polyalcohols, ethers of monoalcohols, ethers of polyalcohols, fatty esters, Guerbet alcohols, isoparaffins, naphthols, glycol ethers, provided that the solvent is not diethyleneglycol monobutyl ether;
b) mixing the silicone resin solution with an aminosiloxane polymer to obtain an aminosiloxane polymer:silicone resin mixture having ratio of about 20:1;
c) allowing the resin mixture to age for at least about 6 hours at ambient temperature;
d) adding the resin mixture to a vessel;
e) optionally adding with agitation, an additional organic solvent to the resin mixture;
f) mixing until homogenous;
g) adding a protonating agent;
h) additionally adding an aqueous carrier in an amount to produce the desired concentration of emulsion.

16 Claims, No Drawings

PROCESS FOR MAKING AN AMINOSILOXANE POLYMER NANOEMULSION

CROSS REFERENCE TO RELATED APPLICATIONS

This application is the U.S. National Phase of PCT Appln. No. PCT/EP2015/067055 filed Jul. 24, 2015, which claims priority to European Application No. 14178766 filed Jul. 28, 2014, the disclosures of which are incorporated in their entirety by reference herein.

BACKGROUND OF THE INVENTION

1. Field of the Invention

The present invention relates to method of making aminosiloxane polymer nanoemulsions and nanoemulsions preparable by this method.

2. Description of the Related Art

Numerous attempts have been made to develop a treatment composition that provides protection of surfaces by repelling water and oil based soils from the surface. Fluoropolymers, such as those used in Scotchguard® from 3M, have become well established as soil-repellant molecules. However, fluoropolymers are not preferred due to environmental, health and safety concerns, such as the potential and possibility of persistent bioaccumulation and toxicity.

Amino-modified silicone microemulsions that contain an amino-modified silicone and a high concentration of both ethylene glycol monoalkyl ether and nonionic surfactant, e.g., polyoxyalkylene branched decyl ether, are known and generally described as transparent in appearance and having a small particle diameter. However, these compositions have the challenge of delivering maximum hydrophobicity to a surface since they incorporate significant amounts of non-ionic surfactant to obtain desired stability and particle sizes.

Unfortunately, to date, the attempts at non-fluorpolymer protection of surfaces continue to demonstrate disadvantages, including low efficiency, difficulty in achieving the desired benefits at affordable cost and in a preferred format, processing and formulation challenges, and product instability. A continued need exists for a non-fluoropolymer technology that delivers depositable benefits to surfaces, such as water and oily soil repellency, in a convenient and stable form and at a high efficiency.

Prior attempts at using non-fluoropolymer technologies have been less than successful due to a general failure to recognize the importance of the order of addition of materials during the preparation process as well as the processing conditions themselves, in addition to optimization of the solvent system, addition of adjunct ingredients that can enhance performance, and equally the removal of adjuncts that can hinder performance.

SUMMARY OF THE INVENTION

The present invention provides a method of making a nanoemulsion comprising the steps of:
a) solubilizing a silicone resin in an organic solvent system to yield a silicone resin solution concentration of about 80% or less, wherein the organic solvent system comprises a single solvent selected from the group consisting of monoalcohols, polyalcohols, ethers of monoalcohols, ethers of polyalcohols, fatty esters, Guerbet alcohols, isoparaffins, naphthols, glycol ethers, provided that if the solvent is a glycol ether it is not diethyleneglycol monobutyl ether;
b) mixing the silicone resin solution from a) with an aminosiloxane polymer to obtain an aminosiloxane polymer: silicone resin mixture having ratio of about 20:1;
c) allowing the aminosiloxane polymer:silicone resin mixture to age for at least about 6 hours at ambient temperature;
d) adding the aminosiloxane polymer:silicone resin mixture to a vessel;
e) optionally adding with agitation an additional organic solvent to the aminosiloxane polymer:silicone resin mixture;
f) mixing until homogenous;
g) adding a protonating agent;
h) additionally adding an aqueous carrier in an amount to produce the desired concentration of emulsion.

DETAILED DESCRIPTION OF THE PREFERRED EMBODIMENTS

The present invention attempts to solve one more of the needs by providing, in one aspect of the invention, a method of making an aminosilicone nanoemulsion which can be incorporated into a surface treatment composition.

Applicants have found that by optimizing the order of addition of the raw materials during emulsion preparation and finished product formulation using the emulsion, the overall stability of the emulsion and finished product can be greatly enhanced. Furthermore, the deposition efficiency and overall soil repellency benefit can be maximized, while minimizing the potential for negative results often seen with silicone-containing compositions, such as staining or spotting of fabrics, laundry machine residues, and product discoloration.

As used herein, the articles including "the," "a" and "an" when used in a claim or in the specification, are understood to mean one or more of what is claimed or described.

As used herein, the terms "include," "includes" and "including" are meant to be non-limiting.

As used herein, the terms "substantially free of" or "substantially free from" means that the indicated material is at the very minimum not deliberately added to the composition to form part of it, or, preferably, is not present at analytically detectable levels. It is meant to include compositions whereby the indicated material is present only as an impurity in one of the other materials deliberately included. Preferably, substantially free from surfactant means that the emulsion comprises at most 1 percent by weight of surfactant, more preferably at most 0.1 percent by weight of surfactant.

As used herein, the term nanoemulsion refers to thermodynamically stable oil in water emulsions that have extremely small droplet sizes (below 750 nm, or typically below 250 nm). These materials have special properties, including optical translucency, very large dispersed phase surface-to-volume ratios and long term kinetic stability. Due to similarity in appearance, translucent nanoemulsions are sometimes confused with microemulsions, which belong to another class of stable (thermodynamically) and optically clear colloidal systems. Microemulsions are spontaneously formed by "solubilizing" oil molecules with a mixture of surfactants, co-surfactants and co-solvents. The required surfactant concentration in a microemulsion is typically several times higher than that in a nanoemulsion and significantly exceeds the concentration of the dispersed phase (generally, oil). Because of many undesirable side-effects caused by surfactants, this is disadvantageous or prohibitive for many applications. In addition, the stability of microemulsions is easily compromised by dilution, heating, or changing pH levels.

By contrast, nanoemulsions in accordance with the present invention are formed by judiciously selecting solvent systems that provide adequate dissolution of the siloxanes and also exhibit some level of miscibility with water, thus a stable aqueous emulsion can be achieved without the use of surfactants. Without wishing to be bound by theory, applicants believe that in choosing a solvent or solvent system whereby the solvents exhibit dual polarity, these solvents of choice can behave similarly to surfactants in solution without introducing the wetting effect that surfactants typically bring. Thus, it is possible to deliver an oil-in-water emulsion, without having surfactant present, that is capable of providing maximum hydrophobicity to a target surface.

All cited patents and other documents are, in relevant part, incorporated by reference as if fully restated herein. The citation of any patent or other document is not an admission that the cited patent or other document is prior art with respect to the present invention.

In this description, all concentrations and ratios are on a weight basis of the total nanoemulsion composition, all pressures are equal to 0.10 MPa (absolute) and all temperatures are equal to 20° C. unless otherwise specified.

Known aminosiloxane polymer microemulsions and methods for preparing aminosiloxane polymer microemulsions employ high levels of solvent and nonionic surfactant (e.g., 12% ethylene glycol monohexyl ether per 100% of aminosiloxane polymer and 40% polyoxyalkylene branched decyl ether per 100% of aminosiloxane polymer), and/or require high energy in the form of heat or high shearing forces in order to obtain the desired nanoparticle size. Without being bound by theory, it is believed that the presence of high levels of solvent and surfactant in the emulsion hinders the deposition of the aminosiloxane polymer on the surface that is to be treated; aminosiloxane polymer droplets in high-solvent and high-surfactant emulsions tend to stay in the emulsion, rather than deposit on the surface. This results in a poor delivery of any benefit, such as increased water repellency or oil repellency, to the surface. Such benefits may be measured as an increased time to wick on treated fabrics, a reduced dry-time for treated fabrics and/or an increased contact angle on a hard surface.

In contrast to conventional aminosiloxane polymer microemulsions, the aminosiloxane polymer nanoemulsions of the present invention comprise reduced levels of solvent and no intentionally added surfactant, and may be obtained without the input of high energy to process the emulsion. Yet, the aminosiloxane polymer nanoemulsions disclosed herein provide highly efficient deposition on a target surface. Benefits derived from this deposition may generally apply in the area of repellency of water and/or water-based compositions and/or oil and/or oil-based compositions, such as water-based stains and oily soils. Without being bound by theory, it is believed that the aminosiloxane polymer nanoemulsions disclosed herein comprise self-assembled, spherical, positively charged aminosiloxane polymer nano-particles (which contain reduced levels of solvent and surfactant). These self-assembled, spherical, positively charged nano-particles exhibit efficient deposition and controlled spreading, that is believed to form a structured film on a surface that provides the repellency benefit as determined by the below specified time to wick method.

The average particle sizes of the disclosed nanoemulsions range from 20 nm to 750 nm, or 20 nm to 500 nm, or 50 nm to 350 nm, or 80 nm to 200 nm, or 90 nm to 150 nm (as measured by Malvern Zetasizer Nano Series instrument.). The disclosed nanoemulsions are generally transparent or slightly milky in appearance.

Typically, the aminosiloxane polymer nanoemulsion of the present invention comprises a silicone resin.

An example of a silicone resin is a mixture of polyorganosiloxane-silicone resins, where each of the one or more silicone resins of the polyorganosiloxane-silicone resin mixture contains at least about 80 mol % of units selected from the group consisting of units of the general formulas 3, 4, 5, and 6:

  (3),

  (4),

  (5),

  (6), in which R is selected from H, —OR$^{10}$, or —OH residues or from monovalent hydrocarbon residues with 1 to 40 carbon atoms, optionally substituted with halogens, where at least 20 mol % of the units are selected from the group consisting of units of the general formulas 5 and 6, and a maximum of 10 wt % of the R residues are —OR$^{10}$ and —OH residues.

The silicone resins are preferably MQ silicone resins (MQ) comprising at least 80 mol % of units, preferably at least 95 mol % and particularly at least 97 mol % of units of the general formulae 3 and 6. The average ratio of units of the general formulae 3 to 6 is preferably at least 0.25, particularly at least 0.5, preferably at most 4, and more preferably at most 1.5.

The silicone resins may also preferably be DT silicone resins (DT) comprising at least 80 mol % of units, preferably at least 95 mol % and particularly at least 97 mol % of units of the general formulae 4 and 5. The average ratio of units of the general formulae 4 to 5 is preferably at least 0.01, particularly at least 0.2, preferably at most 3.5, and more preferably at most 0.5.

Preferred halogen substituents of the hydrocarbon residues R are fluorine and chlorine. Preferred monovalent hydrocarbyl radicals R are methyl, ethyl, and phenyl.

Preferred monovalent hydrocarbyl radicals R$^{10}$ are methyl, ethyl, propyl and butyl.

Suitable aminosiloxane polymers are represented by of one or more liquid aminoalkyl-containing polyorganosiloxanes (P) comprising at least 80 mol % of units selected from units of the general formulae 7, 8, 9 and 10

  (7),

  (8),

  (9),

  (10), where
a has the value 0 or 1,
b has the value 1 or 2,
a+b has a value of 2,
R$^1$ represents monovalent hydrocarbyl radicals having 1-40 carbon atoms, optionally substituted with halogens,
R$^2$ represents either
a) aminoalkyl radicals of the general formula 11

  (11)

where
R⁵ represents divalent hydrocarbyl radicals having 1-40 carbon atoms,
R⁶ represents monovalent hydrocarbyl radicals having 1-40 carbon atoms, H, hydroxymethyl or alkanoyl radicals, and
R⁷ represents a radical of the general formula 12

$$—(R^8—NR^6)_xR^6 \quad (12)$$

where
x has the value 0 or an integer value from 1 to 40, and
R⁸ represents a divalent radical of the general formula 13

$$—(CR^9{}_2—)_y \quad (13)$$

where
y has an integer value from 1 to 6, and
R⁹ represents H or hydrocarbyl radicals having 1-40 carbon atoms, or
b) in the general formula 11 R⁶ and R⁷ combine with the nitrogen atom to form a cyclic organic radical having 3 to 8 —CH₂— units, although nonadjacent —CH₂— units may be replaced by units selected from —C(=O)—, —NH—, —O— and —S—,
R³ represents hydrocarbyl radicals having 1-40 carbon atoms optionally substituted with halogens,
R⁴ represents —OR or —OH radicals, and
wherein, in the polyorganosiloxanes (P), the average ratio of the sum of units of the general formulae 7 and 8 to the sum of units of the general formulae 9 and 10 is in the range from 0.5 to 500, the average ratio of units 9 to 10 being in the range from 1.86 to 100, and the polyorganosiloxanes (P) have an average amine number of at least 0.01 mequiv/g.

The monohydric hydrocarbyl radicals R, R¹, R³, R⁶, R⁹ and R¹⁰ may be halogen substituted, linear, cyclic, branched, aromatic, saturated or unsaturated. Preferably, the monovalent hydrocarbyl radicals R, R¹, R³, R⁶, R⁹ and R¹⁰ each have 1 to 6 carbon atoms, and particular preference is given to alkyl radicals and phenyl radicals. Preferred halogen substituents are fluorine and chlorine. Particularly preferred monovalent hydrocarbyl radicals R, R¹, R³, R⁶, R⁹ and R¹⁰ are methyl, ethyl, and phenyl.

The divalent hydrocarbyl radicals R⁵ may be halogen substituted, linear, cyclic, branched, aromatic, saturated or unsaturated. Preferably, the R⁵ radicals have 1 to 10 carbon atoms, and particular preference is given to alkylene radicals having 1 to 6 carbon atoms, in particular propylene. Preferred halogen substituents are fluorine and chlorine. Preferred R⁶ radicals are alkyl and alkanoyl radicals. Preferred halogen substituents are fluorine and chlorine. Preferred alkanoyl radicals are —C(=O)R¹¹, where R¹¹ has the meanings and preferred meanings of R¹. Particularly preferred substituents R⁶ are methyl, ethyl, cyclohexyl, acetyl and H. It is particularly preferable for the R⁶ and R⁷ radicals to be H.

Preferred cyclic organic radicals formed from R⁶ and R⁷ in the general formula 11 together with the attached nitrogen atom are five and six membered rings, in particular the residues of pyrrolidine, pyrrolidin-2-one, pyrrolidine-2,4-dione, pyrrolidin-3-one, pyrazol-3-one, oxazolidine, oxazolidin-2-one, thiazolidine, thiazolidin-2-one, piperidine, piperazine, piperazine-2,5-dione and morpholine.

Particularly preferred R² radicals are —CH₂NR⁶R⁷, —(CH₂)₃NR⁶R⁷ and —(CH₂)₃N(R⁶) (CH₂)₂N(R⁶)₂. Examples of particularly preferred R² radicals are aminoethylaminopropyl and cyclohexylaminopropyl.

Preference is also given to mixtures (M) wherein at least 1 mol %, more preferably at least 5 mol %, most preferably at least 20 mol % and at most 90 mol %, more preferably at most 70 mol % and most preferably at most 60 mol % of the R⁶ and R⁷ radicals are acetyl radicals and the remaining R⁶ and R⁷ radicals have the meaning H.

Preferably, b is 1. Preferably, a+b has an average value from 1.9 to 2.2.

Preferably, x has the value 0 or a value from 1 to 18, more preferably 1 to 6.

Preferably, y has the values of 1, 2 or 3.

Preferably, the polydiorganosiloxanes (P) comprise at least 3 and particularly at least 10 units of the general formulae 7 and 8.

Preferably, the liquid aminoalkyl-containing polyorganosiloxanes (P) comprise at least 95 mol %, more preferably at least 98 mol % and particularly at least 99.5 mol % of units selected from units of the general formulae 7, 8, 9 and 10.

Further units of the polyorganosiloxanes (P) can be selected for example from units selected from units of the general formulae 3, 4, 5, 6.

The ratio of a to b is chosen such that the polyorganosiloxanes (P) preferably have an amine number of at least 0.1, in particular at least 0.3 mequiv/g of polyorganosiloxane (P). The amine number of the poly-organosiloxanes (P) is preferably at most 7, more preferably at most 4.0 and particularly at most 3.0 mequiv/g of polyorganosiloxane (P).

The amine number designates the number of ml of 1N HCl which are required for neutralizing 1 g of polyorganosiloxane (P).

The viscosity of the polyorganosiloxanes (P) is preferably at least 1 and particularly at least 10 mPa·s and preferably at most 100,000 and particularly at most 10,000 mPa·s at 25° C.

The ratio of the units of the general formulae 7 and 8 to the sum total of 9 and 10 is preferably at least 10, particularly at least 50 and preferably at most 250, particularly at most 150.

The ratio of units 9 to 10 is preferably at least 1.9 and particularly at least 2.0 and preferably at most 70 and particularly at most 50.

The polyorganosiloxanes (P) are obtainable via known chemical processes such as, for example, hydrolysis or equilibration.

The aminosiloxane polymer nanoemulsion of the present invention comprises from 0.1% to 50% of one or more solvents, by weight of the aminosiloxane polymer. In certain aspects, the aminosiloxane polymer nanoemulsion comprises from 5% to 30% of one or more solvents, by weight of the aminosiloxane polymer. In some aspects, the aminosiloxane polymer nanoemulsion comprises from 10% to 25% of one or more solvents, by weight of the aminosiloxane polymer. In other aspects, the aminosiloxane polymer nanoemulsion comprises from 15% to 23% or from 18% to 21% of one or more solvents, by weight of the aminosiloxane polymer.

In one aspect of the invention the solvent system comprises a single solvent. Suitable solvents to be used in a single solvent system are selected from monoalcohols, polyalcohols, ethers of monoalcohols, ethers of polyalcohols, fatty esters, Guerbet alcohols, isoparaffins, naphthols, glycol ethers or mixtures thereof, provided that if the solvent is a glycol ether it is not diethyleneglycol monobutyl ether. In some aspects, the solvent is selected from a mono-, di-, or tri-ethylene glycol monoalkyl ether that comprises an alkyl group having 1-12 carbon atoms, or a mixture thereof. Suitable alkyl groups include methyl, ethyl, propyl, butyl groups, hexyl groups, heptyl groups, octyl groups, nonyl groups, decyl groups, undecyl groups, dodecyl groups, and phenyl groups, as well as acetate groups of each.

Suitable examples of monoethylene glycol monoalkyl ethers include ethyleneglycol methyl ether, ethyleneglycol ethyl ether, ethyleneglycol propyl ether, ethyleneglycol butyl ether, ethyleneglycol butyl ether acetate, ethyleneglycol phenyl ether, ethyleneglycol hexyl ether, and combinations thereof. Suitable examples of diethylene glycol monoalkyl ethers include diethyleneglycol methyl ether, diethyleneglycol ethyl ether, diethyleneglycol propyl ether, diethyleneglycol butyl ether, diethyleneglycol phenyl ether, diethyleneglycol hexyl ether, and combinations thereof.

In some aspects, the solvent is selected from a mono-, di-, or tri-propylene glycol monoalkyl ether that comprises an alkyl group having 1-12 carbon atoms, or a mixture thereof. Suitable alkyl groups include methyl, ethyl, propyl, butyl groups, hexyl groups, heptyl groups, octyl groups, nonyl groups, decyl groups, undecyl groups, dodecyl groups, and phenyl groups as well as acetate groups of each.

Suitable examples of monopropylene glycol monoalkyl ethers include propyleneglycol methyl ether, propyleneglycol methyl ether acetate, propyleneglycol methyl ether diacetate, propyleneglycol propyl ether, propyleneglycol butyl ether, propyleneglycol phenyl ether, and combinations thereof. Suitable examples of dipropylene glycol monoalkyl ethers include dipropyleneglycol methyl ether, dipropyleneglycol methyl ether acetate, dipropyleneglycol propyl ether, dipropyleneglycol butyl ether, and combinations thereof. Suitable examples of tripropylene glycol monoalkyl ethers include tripropyleneglycol methyl ether, tripropyleneglycol propyl ether, tripropyleneglycol butyl ether, and combinations thereof.

In some aspects the solvent is selected from fatty esters such as isopropyl esters of long chain fatty acids having 8 to 21 carbon atoms. Suitable examples of fatty esters include isopropyl laurate, isopropyl myristate, isopropyl palmitate, isopropyl stearate, isopropyl oleate, isopropyl linoleate, and combinations thereof.

In some aspects, the solvent comprises a linear or branched mono- or polyhydric alcohol, or a Guerbet alcohol, such as 2-ethylhexanol, 2-butyloctanol, or 2-hexyldecanol, or mixtures thereof.

In some aspects the solvent comprises a naphthol or isoparaffin having from about 8 to about 16 carbon atoms, such as isoparaffins sold under the trade name Isopar E™, Isopar L™, Isopar G™, or Isopar M™ (available from ExxonMobile Chemicals, Houston, Tex.).

The protonating agent is generally a monoprotic or multiprotic, water-soluble or water-insoluble, organic or inorganic acid. Suitable protonating agents include, for example, formic acid, acetic acid, propionic acid, malonic acid, citric acid, hydrochloric acid, sulfuric acid, phosphoric acid, nitric acid, or mixtures thereof. In some aspects, the protonating agent is selected from formic acid, acetic acid, or a mixture thereof. In some aspects, the protonating agent is acetic acid. Generally, the acid is added in the form of an acidic aqueous solution. The protonating agent is added in an amount necessary to achieve a nanoemulsion pH of from 3.5 to 7.0. In certain aspects, the aminosiloxane polymer nanoemulsions comprise the protonating agent in an amount necessary to achieve a pH of from 3.5 to 6.5 or 4.0 to 6.0. In other aspects, the aminosiloxane polymer nanoemulsions comprise the protonating agent in an amount necessary to achieve a pH of most preferably from 3.5 to 5.0.

The aminosilicone nanoemulsions of the present invention can be diluted to produce any desired concentration of nanoemulsion by the addition of water.

The aminosiloxane polymer nanoemulsions may additionally include further substances, such as preservatives, scents, corrosion inhibitors, UV absorbers, structurants, opacifiers, optical brighteners, and dyes. Examples of preservatives are alcohols, formaldehyde, parabens, benzyl alcohol, propionic acid and salts thereof and also isothiazolinones. The nanoemulsions may further include yet other additives, such as non-silicon-containing oils and waxes. Examples thereof are rapeseed oil, olive oil, mineral oil, paraffin oil or non-silicon-containing waxes, for example carnauba wax and candelilla wax incipiently oxidized synthetic paraffins, polyethylene waxes, polyvinyl ether waxes and metal-soap-containing waxes. In some aspects, the aminosiloxane polymer nanoemulsions further comprise carnauba wax, paraffin wax, polyethylene wax, or a mixture thereof. The nanoemulsions may comprise up to about 5% by weight of the nanoemulsion or from 0.05% to 2.5% by weight of the nanoemulsion of such further substances.

The method for preparing the aminosiloxane polymer nanoemulsions of the present invention includes the steps of: solubilizing the silicone resin in an organic solvent or mixture of organic solvents to yield a resin solution concentration of 80% or less, preferably of 70% or less, more preferably of 60% or less, or most preferably of 55% or less, followed by mixing the resin solution with an amino siloxane polymer to obtain an amino siloxane polymer:resin ratio of about 20:1, preferably about 10:1, more preferably about 7:1, most preferably about 5.8:1, and allowing the mixture to age for at least about 6 hours at room temperature. The emulsion is then prepared by adding the amino siloxane polymer:resin mixture to a vessel containing a small amount of water with agitation, optionally followed by addition of a second organic solvent to aid in the dispersion of the amino siloxane polymer:resin mixture in aqueous carrier; once the solvent, silicone and carrier mixture has become homogenous, then the protonating agent is added, followed by additional amounts of carrier to produce a nanoemulsion at the desired concentration. Optional adjunct materials are then added to the mixture and agitated until thoroughly mixed.

The aminosiloxane polymer nanoemulsions of the present invention may be incorporated into treatment compositions or cleaning compositions, such as, but not limited to, a fabric care composition, a hard surface care composition, or a home care composition.

Examples of treatment compositions include, but are not limited to, laundry spray treatment products, laundry pre-treatment products, fabric enhancer products, hard surface treatment compositions (hard surfaces include exterior surfaces, such as vinyl siding, windows, and decks), carpet treatment compositions, and household treatment compositions. Examples of fabric care compositions suitable for the present disclosure include, but are not limited to, laundry spray treatment products, laundry pre-treatment products, laundry soak products, and rinse additives. Examples of suitable home care compositions include, but are not limited to, rug or carpet treatment compositions, hard surface treatment compositions, floor treatment compositions, and window treatment compositions.

In some aspects, the treatment composition may be provided in combination with a nonwoven substrate, as a treatment implement.

In certain aspects, the compositions provide water and/or oil repellency to the treated surfaces, thereby reducing the propensity of the treated surface to become stained by deposited water- or oil-based soils.

By "surfaces" it is meant any surface. These surfaces may include porous or non-porous, absorptive or non-absorptive substrates. Surfaces may include, but are not limited to, celluloses, paper, natural and/or synthetic textiles fibers and fabrics, imitation leather and leather. Selected aspects of the present invention are applied to natural and/or synthetic textile fibers and fabrics.

By "treating a surface" it is meant the application of the composition onto the surface. The application may be performed directly, such as spraying or wiping the composition onto a hard surface. The composition may or may not be rinsed off, depending on the desired benefit.

Test Methods

Time to Wick (T2W) Measurement Method:

The fabric Time to Wick property is a measure of the water repellency of a fabric, where longer times indicate greater repellency. Water repellency is measured when a drop of water is applied to the fabric, such as white 6.1 oz (165-200 gsm) Gildan Ultra 100% Cotton t-shirts (size large, item number 2000, Gildan USA, Charleston, S.C.). The Gildan t-shirts are prepared by de-sizing for 2 cycles of laundering with clean rinses using the AATCC 2003 standard reference liquid detergent without optical brighteners (AATCC—American Association of Textile Chemists and Colorists, Research Triangle Park, N.C., USA) in a standard top-loader, North American style washing machine, such as a Kenmore 600 Model 110.28622701. For treatment, 12 t-shirts are added to the drum of a standard washing machine, set on Heavy Duty wash cycle, water level equal to 17 gallons (Super load size), warm water, selected with single rinse option. Water is regulated to standardize the wash temperature to 90° F., Rinse to 60° F., and water hardness to 6 grain per gallon. Detergent is added to the wash water, such as Tide liquid Detergent (50.0 g dose), Clean Breeze scent. With the fabrics in the washer, the rinse water is allowed to fill the tub. Prior to agitation, the fabric treatment composition of the present invention (40 grams) is equally dispersed and added to the rinse water, followed by completion of the rinse cycle. The garments are then placed in a standard dryer, such as a Kenmore standard 80 series, cotton cycle (high heat), for 30 minutes or until dry. The fabrics are then removed from the dryer and placed in a cool, well ventilated room with controlled humidity set at 50% RH, and temperature regulated to 70° F., for a period of 24-48 hours. The section of the fabric that will be measured for Time to Wick is subjected to UV light, such as standard overhead lab lighting, for 24-48 hours prior to measurement. Treated test fabric is compared for Time to Wick value versus an untreated control fabric that has been prepared in a similar manner as the test fabric without the addition of the fabric treatment composition.

The Time to Wick value is measured as follows: On a flat, level hard surface (e.g. benchtop) a fresh square of a paper towel at least 10 cm×10 cm in size, is placed inside the prepared t-shirt so that 1 layer of fabric is being measured.

A 300 µL drop of DI water is then dispensed onto the fabric surface from a calibrated pipette. The process of absorption of the liquid drop is visually monitored and recorded counting the time elapsed in seconds. Eight drops are administered per t-shirt, with each drop placed at a different location separate from all adjacent drops.

For each drop, the time differential between when the drop is applied and when absorbed is calculated and recorded in seconds. The time at drop absorption is defined as being the earliest time point at which no portion of the drop is observed remaining above the surface of the fabric. If the drop remains after 10 minutes, observation is discontinued. Such drops are recorded as having a time differential of 600 seconds. The Time to Wick value for a given liquid on fabric is the average of the time differentials recorded for 8 drops of that liquid. In order to determine the effect of a treatment, comparisons are made between the average Time to Wick value obtained from the treated fabric, versus the average obtained from its untreated control fabric using the same liquid, where longer times indicate greater repellency.

Particle Size Measurement Test Method by Using Malvern Zetasizer Nano ZS

The organosilicone nanoemulsions finished product containing the nanoemulsions are measured either neat or diluted with DI water to a specific concentration (1:10, 1:500 or 1:1000) with filtered DI water (using Gelman acrodisc LC PVDF 0.45 µm) prior to making particle size measurements. The particle size measurement is performed immediately after the sample completely disperses in water. The data is reported as the average of 3 readings.

Sample Preparation:

The dilution used will be dependent upon the type of sample:silicone emulsions are diluted at a concentration of 1:500 and 1:1000 and finish products are measured as neat and diluted to a concentration of 1:10 in DI water.

Before diluting the sample, gently invert it several times to mix it well.

Rinse the 10 ml vial with filtered DI water to remove any dust then pipette a specific amount of filtered DI water and sample to the vial to make up the correct concentration (1:10, 1:500 or 1:1000). Invert the vial several times to make sure the sample completely disperses in water.

Add 1 ml of diluted sample or neat sample to a clean cuvette ensuring that there are no air bubbles present in the sample.

Instrument Set Up Conditions:

The particle size measurements are made via Malvern Zetasizer Nano Series ZS, with model #ZEN3600 with the fixed parameter settings for both Silicone emulsion and finish product:

| Material: | Silicone | |
|---|---|---|
| | Refractive Index (RI) | 1.400 |
| | Absorption | 0.001 |
| Dispersion: | Water | |
| | Temp. | 25° C. |
| | Viscosity | 0.8872cP |
| | RI | 1.33 |

| General Option: Using dispersant viscosity as sample viscosity | |
|---|---|
| Temperature: | 25° C. |
| Aging time: | 0 second |
| Cell Type: | DTS0012- Disposable sizing cuvette |
| Measurement: | Meas. Angle 173° Backscatter (NIBS default) |
| Meas. Duration | Manual |
| Number of runs | 3 |
| Run duration | 60 s |
| Number of Meas. | 3 |
| Delay between meas . | 0 s |
| Positioning method | Seek for optimum position |
| | Automatic attenuation selection |
| Yes | |

| Data Processing: (normal resolution) | Analysis model | General purpose |
|---|---|---|

Time to Dry Test Method:

Test Method for Determining the Range of Nanoparticle Typical Diameters and the Presence/Absence of Nanoparticle Aggregates, Using a Cryo-Transmission Electron Microscope (cryo-TEM).

Samples of the liquid composition to be tested are prepared for microscopic analysis in order to observe nanoparticles that may be suspended in the composition. Sample preparation involves pipetting approximately 5 μl of the liquid composition onto a holey carbon grid (such as Lacey Formvar Carbon on 300 mesh copper grid, P/N 01883-F, available from Ted Pella Inc., Redding, Calif., U.S.A., or similar). The excess liquid is blotted away from the edge of the grid with a filter paper (such as Whatman brand #4, 70 mm diameter, manufactured by GE Healthcare/General Electric Company, Fairfield, Conn., U.S.A., or similar). The grid-mounted sample is plunged rapidly into liquid ethane using a freezing apparatus capable of producing a flash-frozen vitreous thin film of sample lacking crystalline ice (such as a Controlled Environment Vitrification System (CEVS device), or similar apparatus). The apparatus configuration and use of a CEVS device is described in the *Journal of Electron Microscopy Technique* volume 10 (1988) pages 87-111. Liquid ethane may be prepared by filling an insulated container with liquid nitrogen and placing a second smaller vessel into the liquid nitrogen. Gaseous ethane blown through a syringe needle into the second vessel will condense into liquid ethane. Tweezers pre-cooled in liquid nitrogen are used to rapidly handle the frozen grids while taking great care to maintain the vitreous non-crystalline state of the sample and minimize the formation of frost on the sample. After being flash frozen the grid-mounted samples are stored under liquid nitrogen until being loaded into the cryo-TEM via a cryo transfer holder (such as Gatan model 626 Cryo-Holder available from Gatan Inc., Warrendale, Pa., U.S.A., attached to a TEM instrument such as the model Tecnai $G^2$ 20 available from FEI Company, Hillsboro, Oreg., U.S.A., or similar). The cryo-TEM is equipped with a camera such as the Gatan Model 994 UltraScan 1000XP (available from Gatan Inc., Warrendale, Pa., U.S.A.). The grid-mounted frozen samples are imaged in the cryo-TEM using low beam dosages (such as 200 KV in Low Dose Mode) in order to minimize sample damage. Suitable magnifications are selected in order to observe the size of nanoparticles which may be present. This may include magnifications in the range of 5,000×-25,000×. During imaging the sample is kept as cold as possible, typically at or near the temperature of liquid nitrogen (approximately minus 175° C.). Images of the samples are carefully examined to detect the presence of artifacts. A grid-mounted sample is discarded if any crystalline ice. Images are inspected for beam damage artifacts and are rejected if damage is observed. For each grid-mounted sample, representative images are captured of approximately 40 fields of view which are representative of the sample. These images are used to determine the range of nanoparticle typical diameters, and to determine the presence or absence of nanoparticle aggregates. In each image, the diameters are measured from nanoparticles which are typical of that image. The range of typical diameter values reported for the composition is the range of the diameters measured across all images captured from that composition. In each image, the spacing between nanoparticles is observed. A nanoparticle aggregate is defined as a cluster which contains at least 10 nanoparticles clumped together, rather than being individually dispersed. Nanoparticle aggregates are reported as present if at least one nanoparticle aggregate is observed in at least one image captured from that composition.

EXAMPLES

Solvent Examples The following list of solvent options is for illustrative purposes of making the silicone resin solution of example prep 2 below and is considered to be non-limiting:

TABLE I

Example Solvents

| | A | B | C |
|---|---|---|---|
| Guerbet Alcohols | 2-Ethylhexanol[1] | 2-Butyloctanol[2] | 2-Hexyldecanol[3] |
| | D | E | F |
| Glycol Ethers | Propyleneglycol n-Butyl ether[4] | Dipropyleneglycol n-Butyl ether[5] | Tripropyleneglycol n-Butyl ether[6] |
| | G | H | I |
| Fatty Esters | Isopropyl Laurate[7] | Isopropyl Myristate[8] | Isopropyl Palmitate[9] |

1. Preparation of Resin Solution

In a 400 mL beaker add specified amount of MQ resin powder ($\{[Me_3SiO_{1/2}]_{0.373}[SiO_2]_{0.627}\}_{40}$, Mn=2700 g/mol, resin contains 0.2% OH and 3.1% OEt [corresponds to $OR^{10}$]) according to Table II below; slowly add solvent(s) and begin mixing using an Ika RWA-20 mixer with a 4-blade agitator (2 inch diameter tip-to-tip)_having 45° pitch on each blade using appropriate level of agitation. Continue with gentle mixing until all resin powder is completely dissolved; allow solution to settle at least 24 hours to allow for complete de-aeration.

TABLE II

Example Resin solution compositions

Resin Solution Examples

| Component | J | K | L | M | N | O | P | Q | R | S | T |
|---|---|---|---|---|---|---|---|---|---|---|---|
| Resin Powder[10] | 55.7 | 55.7 | 55.7 | 55.7 | 55.7 | 55.7 | 55.7 | 55.7 | 55.7 | 55.7 | 55.7 |
| Total Solvent wt. (g) | 44.3 | 44.3 | 44.3 | 44.3 | 44.3 | 44.3 | 44.3 | 44.3 | 44.3 | 44.3 | 44.3 |
| Butyl Carbitol[11] | 0 | 2.0 | 4.0 | 6.0 | 8.0 | 10.0 | 12.0 | 14.0 | 16.0 | 18.0 | 19.0 |
| Solvent A-I | 44.3 | 42.3 | 40.3 | 38.3 | 36.3 | 34.3 | 32.3 | 30.3 | 28.3 | 26.3 | 25.3 |

2. Preparation of Resin-Aminosilicone Oil Mixture

To a 6 oz. glass container add 76.3 g of aminosilicone fluid and 23.7 g of resin solution according to Table III below.

The amine oil U has a viscosity about 1000 mm²/s at 25° C. [corresponds to units of formulas 7+8+9+10=230], functional radicals —$(CH_2)_3NH(CH_2)NH_2$ [corresponds to $R^2$], amine number of 0.5 mmol/g, 92% SiMe$_3$ end groups, and 8% SiMe$_2$OH end groups [corresponds to units of formulas 9/10=11.5].

The amine oil V has a viscosity about 1000 mm$^2$/s at 25° C. [corresponds to units of formulas 7+8+9+10=230], functional radicals —(CH$_2$)$_3$NH(CH$_2$)NH$_2$ [corresponds to R$^2$], amine number of 0.5 mmol/g, 85% SiMe$_3$ end groups, and 15% SiMe$_2$OH end groups [corresponds to units of formulas 9/10=5.7].

The amine oil W has a viscosity about 1000 mm$^2$/s at 25° C. [corresponds to units of formulas 7+8+9+10=230], functional radicals —(CH$_2$)$_3$NH(CH$_2$)NH$_2$ [corresponds to R$^2$], amine number of 0.5 mmol/g, 80% SiMe$_3$ end groups, and 20% SiMe$_2$OH end groups [corresponds to units of formulas 9/10=4.0].

Mix fluids until completely homogenous using an Ika® RWA-20 mixer with a 4-blade agitator having 45° pitch on each blade using appropriate level of agitation. Place lid on container and allow oil mixture to age at room temperature for at least 72 hours.

TABLE III

Example Resin-Aminosilicone Oil mixture solutions

| | Resin-AminoSilicone Oil Mixture Examples | | |
|---|---|---|---|
| Example | U | V | W |
| Aminosilicone Terminal group | 8% —OH termination | 15% —OH termination | 20% —OH termination |
| Aminosilicone amt. (g) | 76.3 | 76.3 | 76.3 |
| Resin solution, Ex. J-T (g) | 23.7 | 23.7 | 23.7 | allowing each addition to fully incorporate prior to adding the next. Continue agitation to ensure the mixture is completely emulsified.

TABLE IV

Example Aminosilicone-Resin Emulsions

| | Silicone-Resin Emulsion Examples | | | | | |
|---|---|---|---|---|---|---|
| Component (g) | AA | BB | CC | DD | EE | FF |
| Oil Mix. Example U-W | 39.0 | 39.0 | 39.0 | 39.0 | 39.0 | 39.0 |
| Solvent from examples A-I$^{1-9}$ | — | 1.5 | 1.2 | 0.8 | 9.75 | 19.5 |
| Butyl Carbitol$^{11}$ | 19.5 | 18.0 | 18.3 | 18.7 | 9.75 | 0.0 |
| Resin Composition from Table II | T | J, T | T | T | T | J-T |
| Protonating Agent$^{12}$ | 0.9 | 0.9 | 0.9 | 0.9 | 0.9 | 0.9 |
| Water (13.5 g × 3) | 40.6 | 40.6 | 40.6 | 40.6 | 40.6 | 40.6 |
| Total Amount (g) | 100.0 | 100.0 | 100.0 | 100.0 | 100.0 | 100.0 |

4. Finished Product Formulation Examples

In a 400 mL beaker, add specified amount of emulsion from examples AA-FF, followed by perfume; begin mixing solution using an Ika® RWA-20 mixer with a 4-blade agitator having 45° pitch on each blade using appropriate level of agitation. Add solvent to the mixture with continued agitation, allowing solvent to fully incorporate. Add deposition aid polymer followed by water; continue to mix until fully incorporated. Add preservative, followed by surfactant, then add the protonating agent and allow the mixture to fully incorporate. Finish product with continued agitation by adding the dye following the specified order of addition in Table V below:

TABLE V

Example Finished Product Formulations

| | Finished Product Example Formulations | | | | | | | |
|---|---|---|---|---|---|---|---|---|
| Component (g) | Comparative Example GG | Order of Addition | HH | Order of Addition | Comparative Example II | Order of Addition | Comparative Example JJ | Order of Addition |
| Emulsion from ex. AA-FF | 25.8 | 1 | 25.8 | 1 | 25.8 | 1 | 25.8 | 2 |
| Perfume | 0.8 | 2 | 0.8 | 2 | 0.8 | 2 | 0.8 | 3 |
| Butyl Carbitol | 4.0 | 3 | 4.0 | 3 | — | — | 4.0 | 4 |
| Solvent ex. A-I | — | — | — | — | 4.0 | 3 | — | — |
| Surfactant$^{12}$ | 0.1 | 4 | 0.1 | 7 | 0.1 | 7 | 0.1 | 5 |
| Protonating Agent$^{13}$ | 0.25 | 5 | 0.25 | 8 | 0.25 | 8 | 0.25 | 6 |
| Water | 62.65 | 6 | 62.65 | 5 | 62.65 | 5 | 62.65 | 1 |
| Deposition Aid Polymer$^{14}$ | 6.35 | 7 | 6.35 | 4 | 6.35 | 4 | 6.35 | 7 |
| Preservative$^{15}$ | 0.1 | 8 | 0.1 | 6 | 0.1 | 6 | 0.1 | 8 |
| Dye$^{16}$ | 0.004 | 9 | 0.004 | 9 | 0.004 | 9 | 0.004 | 9 |

3. Preparation of Aminosilicone-Resin Emulsion

In a 250 mL beaker add 78.0 g of oil mixture from examples U-W above, followed by additional solvent according to Table IV below. Begin mixing solution using an Ika® RWA-20 mixer with a 4-blade agitator having 45° pitch on each blade using appropriate level of agitation. Continue mixing; once solvent has completely incorporated, add specified protonation agent to the mixture; add remaining water slowly and in 3 separate but equal increments,

[1] 2-Ethylhexanol: Available from Sigma-Aldrich, St. Louis, Mo.
[2] 2-Butyloctanol: Available from Sasol Chemical, Johannesburg, South Africa
[3] 2-Hexyldecanol: Available from Sigma-Aldrich, St. Louis, Mo.
[4] Propyleneglycol n-butyl ether: Available from Dow Chemical, Midland Mich.
[5] Dipropyleneglycol n-butyl ether: Available from Dow Chemical, Midland Mich.

[6] Tripropyleneglycol n-butyl ether: Available from Dow Chemical, Midland Mich.
[7] Isopropyl Laurate: Available from Sigma-Aldrich, St. Louis, Mo.
[8] Isopropyl Myristate: Available from Evonik Corporation, Hopewell, Va.
[9] Isopropyl Palmitate: Available from Evonik Corporation, Hopewell, Va.
[10] Silicone MQ Resin: Wacker MQ 803TF, available from Wacker Chemie, AG; Burghausen, Germany
[11] Butyl Carbitol: available from Dow Chemical, Midland Mich.
[12] Surfactant: TAE-80, Tallow Alkyl ethoxylate, available from Akzo-Nobel
[13] Protonating Agent: Glacial Acetic Acid, 97%, available from Sigma-Aldrich, St. Louis, Mo.
[14] Deposition Aid Polymer: Terpolymer of acrylamide, acrylic acid and methacrylamidopropyl trimethylammonium chloride; Available from Nalco Chemicals, Naperville, Ill.
[15] Preservative: Proxel GXL, available from Lonza Group, Basel, Switzerland
[16] Dye: Liquitint Blue AH; available from Milliken, Spartanburg, S.C.

Data:

TABLE VI

Characterization of Finished product for Appearance and Particle size

| | Finished Product (FP) Formulation Example | | | |
|---|---|---|---|---|
| | GG | HH | II | JJ |
| Cryo-TEM visual appearance | Product Phase split | Uniform particles, no void volumes | Product Phase split | Distribution of particle sizes, apparent void volumes |
| Avg. Particle Size (nm.); FP | Not Tested | | Not Tested | |

TABLE VII

Stability of Finished Products and Performance

| | Finished Product (FP) Formulation Example | | | |
|---|---|---|---|---|
| | GG | HH | II | JJ |
| Initial Product Stability | Fail | Pass | Fail | Pass |
| Initial TTW Performance* | Not Tested | _% Pass, avg. TTW = _sec. | Not Tested | _% Pass, avg. TTW = _sec. |
| 8 Week Stability | Not Tested | Pass | Not tested | Fail |
| 8 Week TTW Performance | _% Pass, avg. TTW = _sec. | _% Pass, avg. TTW = _sec. | _% Pass, avg. TTW = _sec. | _% Pass, avg. TTW = _sec. |

The invention claimed is:

1. A method of making an aqueous nanoemulsion, comprising the steps of, in the order given for steps c) through h):

a) solubilizing a silicone resin in an organic solvent system to yield a silicone resin solution concentration of 80% or less, wherein the organic solvent system comprises a single solvent selected from the group consisting of monoalcohols, polyalcohols, ethers of monoalcohols, ethers of polyalcohols, fatty esters, Guerbet alcohols, isoparaffins, naphthols, glycol ethers, provided that if the solvent is a glycol ether it is not diethyleneglycol monobutyl ether;

b) mixing the silicone resin solution from a) with an aminoalkyl-containing polyorganosiloxane (P) comprising at least 80 mol % of units of the formulae 7, 8, 9 and 10

$$R^1{}_2SiO_{(4-a-b)/2} \tag{7}$$

$$R^1{}_a R^2{}_b SiO_{(4-a-b)/2} \tag{8}$$

$$R^3{}_3 SiO_{(1/2)} \tag{9}$$

$$R^3{}_2 R^4 SiO_{(1/2)} \tag{10}$$

where
a is 0 or 1,
b is 1 or 2,
a+b is 2,
$R^1$ are monovalent hydrocarbyl radicals having 1-40 carbon atoms, optionally substituted with halogens,
$R^2$ are either
a) aminoalkyl radicals of the formula 11

$$-R^5-NR^6R^7 \tag{11}$$

where
$R^5$ are divalent hydrocarbyl radicals having 1-40 carbon atoms,
$R^6$ are monovalent hydrocarbyl radicals having 1-40 carbon atoms, H, hydroxymethyl or alkanoyl radicals, and
$R^7$ are radicals of the formula 12

$$-(R^8-NR^6)_x R^6 \tag{12}$$

where
x is 0 or an integer from 1 to 40, and
$R^8$ is a divalent radical of the formula 13

$$-(CR^9{}_2-)_y \tag{13}$$

where
y is an integer from 1 to 6, and
$R^9$ are H or a hydrocarbyl radical having 1-40 carbon atoms, or b) in the formula 11, $R^6$ and $R^7$ combine with nitrogen to form a cyclic organic radical having 3 to 8 —$CH_2$— units, wherein nonadjacent —$CH_2$— units are optionally replaced by —C(=O)—, —NH—, —O— or —S—, units
$R^3$ are hydrocarbyl radicals having 1-40 carbon atoms, and optionally substituted with halogens,
$R^4$ are —OR or —OH radicals, and
wherein, in the polyorganosiloxanes (P),
the average ratio of the sum of units of the formulae 7 and 8 to the sum of units of the formulae 9 and 10 is in the range from 0.5 to 500, the average ratio of units 9 to 10 is in the range from 1.86 to 100, and the polyorganosiloxanes (P) have an average amine number of at least 0.01 mequiv/g, to obtain an aminosiloxane polymer:silicone resin mixture having ratio of 20:1;

c) allowing the aminosiloxane polymer:silicone resin mixture to age for at least 6 hours at ambient temperature;

d) introducing or maintaining the aminosiloxane polymer:silicone resin mixture to a vessel;

e) optionally adding with agitation, an additional organic solvent to the aminosiloxane polymer:silicone resin mixture;

f) mixing until homogenous;

g) adding a protonating agent; and h) adding an aqueous carrier in an amount to produce the aqueous nanoemulsion.

2. A method of making a nanoemulsion of claim 1, wherein the emulsion contains at most 1 weight percent of surfactant based on the total weight of the nanoemulsion.

3. A method of making an emulsion of claim 1, wherein the silicone resin comprises at least 80 mol % of units of the formulas 3, 4, 5, 6:

i) $R^3SiO_{1/2}$ (3), ii) $R^2SiO_{2/2}$ (4), iii) $RSiO_{3/2}$ (5), iv) $SiO_{4/2}$ (6), in which R is selected from H, —$OR^{10}$, or —OH residues or monovalent hydrocarbon residues with 1 to 40 carbon atoms, optionally substituted with halogens, where at least 20 mol % of the units are units of the formulas 5 and 6, where $R^{10}$ is a monovalent hydrocarbon residue with 1 to 10 carbon atoms, and a maximum of 10 wt % of the R residues are —OR and —OH residues.

4. The method of making a nanoemulsion of claim 1, wherein the protonating agent is a monoprotic or multiprotic, water-soluble or water-insoluble, organic or inorganic acid.

5. The method of making a nanoemulsion of claim 1, wherein at least one Guerbet alcohol is employed, and the Guerbet alcohol comprises at least one of 2-ethylhexanol, 2-butyl octanol, or 2-hexyl decanol.

6. The method of making a nanoemulsion according to claim 1, wherein at least one fatty ester is employed, and fatty ester comprises at least one of isopropyl laurate, isopropyl palmitate, isopropyl myristate, isopropyl stearate, isopropyl oleate, or isopropyl linoleate.

7. The method of making a nanoemulsion of claim 1, wherein at least one glycol ether is a mono-, di-, or triethyleneglycol alkyl ether having ether moieties containing up to 8 carbon atoms, or is a mono-, di-, or tripropyleneglycol alkyl ether having ether moieties containing up to 8 carbon atoms.

8. The method of making a nanoemulsion of claim 1, wherein at least one silicone resin is an MQ silicone resin, having a ratio of M units to Q units of 0.67:1.

9. The method of making an aqueous nanoemulsion of claim 1, wherein at least one protonating agent is formic acid, acetic acid, sulphuric acid, phosphoric acid, hydrochloric acid, or citric acid.

10. An aqueous nanoemulsion prepared by the method of claim 1.

11. The method of claim 1, wherein no surfactant is present.

12. The method of claim 1, wherein less than 0.1 wt. % of surfactant is present based on the total weight of the nanoemulsion.

13. The method of claim 1, wherein emulsified particles of the nanoemulsion have a mean particle size within the range of 20 nm to 750 nm.

14. The method of claim 1, wherein emulsified particles of the nanoemulsion have a mean particle size within the range of 20 nm to 500 nm.

15. The method of claim 1, wherein emulsified particles of the nanoemulsion have a mean particle size within the range of 50 nm to 350 nm.

16. The method of claim 1, wherein the single solvent is selected from the group consisting of monoalcohols, polyalcohols, ethers of monoalcohols, propylene glycol monoethers, dipropylene glycol monoethers, tripropylene glycol monoethers, fatty esters, Guerbet alcohols, isoparaffins, naphthols, and mixtures thereof.

* * * * *